US012618286B2

(12) United States Patent
Kendall et al.

(10) Patent No.: US 12,618,286 B2
(45) Date of Patent: May 5, 2026

(54) INDUCTION COIL EMBEDDED IN LAMINATE LAYER

(71) Applicant: Endura Products, LLC, Colfax, NC (US)

(72) Inventors: Adam Kendall, Burlington, NC (US); Bruce Procton, Greensboro, NC (US)

(73) Assignee: Endura Products, LLC, Colfax, NC (US)

( * ) Notice: Subject to any disclaimer, the term of this patent is extended or adjusted under 35 U.S.C. 154(b) by 128 days.

(21) Appl. No.: 18/211,797

(22) Filed: Jun. 20, 2023

(65) Prior Publication Data

US 2023/0410578 A1 Dec. 21, 2023

Related U.S. Application Data

(60) Provisional application No. 63/353,972, filed on Jun. 21, 2022.

(51) Int. Cl.
| | |
|---|---|
| *E06B 7/28* | (2006.01) |
| *E06B 3/70* | (2006.01) |
| *G07C 9/00* | (2020.01) |
| *H02J 50/00* | (2016.01) |
| *H02J 50/10* | (2016.01) |

(52) U.S. Cl.
CPC ................. *E06B 7/28* (2013.01); *E06B 3/70* (2013.01); *G07C 9/00174* (2013.01); *E06B 2003/7051* (2013.01); *G07C 2009/00642* (2013.01); *H02J 50/005* (2020.01); *H02J 50/10* (2016.02)

(58) Field of Classification Search
None
See application file for complete search history.

(56) References Cited

U.S. PATENT DOCUMENTS

| | | |
|---|---|---|
| 257,401 A | 5/1882 | Somers |
| 284,381 A | 9/1883 | Clark |
| 1,208,565 A | 12/1916 | Johnson |
| 1,574,023 A | 2/1926 | Crompton et al. |
| 1,985,176 A | 12/1934 | Lamb |
| 2,253,495 A | 8/1941 | Cordrey |
| 3,040,391 A | 6/1962 | Saunders |
| (Continued) | | |

FOREIGN PATENT DOCUMENTS

| | | |
|---|---|---|
| AU | 2000053315 | 1/2001 |
| CA | 2650128 A1 | 10/2007 |
| (Continued) | | |

OTHER PUBLICATIONS

Machine translation of DE102008049328A1.*

(Continued)

*Primary Examiner* — Marcus Menezes
(74) *Attorney, Agent, or Firm* — IceMiller LLP

(57) ABSTRACT

A door including a laminated member, an energy receiver, and an electrical device. The laminated member has a plurality of layers are bonded to one another. The energy receiver is configured to inductively receive electrical energy from an energy transmitter. The energy receiver includes a receiver coil forming a portion of at least one layer of the plurality of layers of the laminated member. The electrical device is disposed substantially or entirely within the door and is electrically coupled to the energy receiver.

25 Claims, 6 Drawing Sheets

(56)             References Cited

U.S. PATENT DOCUMENTS

| | | | |
|---|---|---|---|
| 3,046,776 A | 7/1962 | Marotto | |
| 3,126,727 A | 3/1964 | Dillard et al. | |
| 3,435,644 A | 4/1969 | Hines | |
| 3,594,031 A | 7/1971 | Ford | |
| 3,672,714 A | 6/1972 | Schultz | |
| 3,848,361 A | 11/1974 | Foster et al. | |
| 3,910,613 A | 10/1975 | Nolin | |
| 3,999,789 A | 12/1976 | Maurits | |
| 4,140,357 A | 2/1979 | Wolz et al. | |
| 4,353,582 A | 10/1982 | Figemeier | |
| 4,445,299 A | 5/1984 | Lehikoinen et al. | |
| 4,453,345 A | 6/1984 | Maus | |
| 4,500,120 A | 2/1985 | Ridgewell | |
| 4,825,615 A * | 5/1989 | Turner | E06B 3/74 |
| | | | 52/656.5 |
| 4,850,208 A | 7/1989 | Weinerman et al. | |
| 4,876,783 A | 10/1989 | Campion et al. | |
| 4,899,562 A | 2/1990 | Gartner et al. | |
| 4,926,664 A | 5/1990 | Gartner et al. | |
| 5,134,870 A | 8/1992 | Uyeda et al. | |
| 5,189,837 A | 3/1993 | Ienaga | |
| 5,193,861 A | 3/1993 | Juga et al. | |
| 5,212,907 A | 5/1993 | Van Sandt | |
| 5,290,077 A | 3/1994 | Fleming | |
| 5,394,718 A | 3/1995 | Hotzl | |
| 5,404,737 A | 4/1995 | Hotzl | |
| 5,437,174 A | 8/1995 | Aydin | |
| 5,474,348 A | 12/1995 | Palmer et al. | |
| 5,490,699 A | 2/1996 | Uyeda | |
| 5,496,082 A | 3/1996 | Zuckerman | |
| 5,520,423 A | 5/1996 | Finkelstein | |
| 5,524,941 A | 6/1996 | Fleming | |
| 5,544,924 A | 8/1996 | Paster | |
| 5,564,296 A | 10/1996 | Theriault et al. | |
| 5,685,584 A | 11/1997 | Baren et al. | |
| 5,690,501 A | 11/1997 | Mader | |
| 5,715,715 A | 2/1998 | Nunez | |
| 5,727,960 A | 3/1998 | Zehrung | |
| 5,933,086 A | 8/1999 | Tischendorf et al. | |
| 6,108,989 A | 8/2000 | Kordes | |
| 6,152,498 A | 11/2000 | Lindqvist | |
| 6,209,931 B1 | 4/2001 | Von Stoutenborough et al. | |
| 6,217,087 B1 | 4/2001 | Fuller | |
| 6,230,528 B1 | 5/2001 | Don | |
| 6,250,119 B1 | 6/2001 | Flon | |
| 6,266,981 B1 | 7/2001 | von Resch et al. | |
| 6,282,929 B1 | 9/2001 | Eller et al. | |
| 6,354,121 B1 | 3/2002 | Frolov | |
| 6,381,999 B1 * | 5/2002 | Doong | E05B 47/0012 |
| | | | 292/144 |
| 6,443,506 B1 | 9/2002 | Su | |
| 6,474,118 B2 | 11/2002 | Martinez | |
| 6,478,345 B1 | 11/2002 | Viney | |
| 6,497,072 B2 | 12/2002 | Fries | |
| 6,532,779 B2 | 3/2003 | Shen | |
| 6,557,909 B2 | 5/2003 | Morris | |
| 6,637,784 B1 | 10/2003 | Hauber | |
| 6,688,656 B1 | 2/2004 | Becken | |
| 6,732,557 B1 | 5/2004 | Zehrung | |
| 6,793,253 B2 | 9/2004 | Bruwer et al. | |
| 6,812,407 B1 | 11/2004 | Opperman | |
| 6,826,867 B1 | 12/2004 | McDonald | |
| 6,895,791 B2 | 5/2005 | Alexander et al. | |
| 6,929,293 B2 | 8/2005 | Tonges | |
| 6,971,686 B2 | 12/2005 | Becken | |
| 7,025,394 B1 | 4/2006 | Hunt | |
| 7,051,561 B2 | 5/2006 | Moon et al. | |
| 7,222,508 B2 | 5/2007 | Dickhans et al. | |
| 7,293,389 B2 | 11/2007 | Jacobs | |
| 7,303,215 B2 | 12/2007 | Moon et al. | |
| 7,353,637 B2 | 4/2008 | Harger et al. | |
| 7,377,076 B2 | 5/2008 | Shedd | |
| 7,421,868 B2 | 9/2008 | Matyko et al. | |
| 7,497,486 B1 | 3/2009 | Davis et al. | |
| 7,520,152 B2 | 4/2009 | Sabo et al. | |
| 7,526,933 B2 | 5/2009 | Meekma | |
| 7,634,928 B2 | 12/2009 | Hunt | |
| 7,677,067 B2 | 3/2010 | Riznik | |
| 7,696,644 B2 | 4/2010 | Metz et al. | |
| 7,701,331 B2 | 4/2010 | Tran | |
| 7,707,862 B2 | 5/2010 | Walls et al. | |
| 7,735,882 B2 | 6/2010 | Abdollahzadeh et al. | |
| 7,752,875 B2 | 7/2010 | Constantinou et al. | |
| 7,836,737 B2 | 11/2010 | Lin | |
| 7,849,718 B2 | 12/2010 | Ambrass | |
| 7,856,857 B2 | 12/2010 | Tsai | |
| 7,878,034 B2 | 2/2011 | Alber | |
| 7,918,117 B2 | 4/2011 | Frolov et al. | |
| 7,926,315 B2 | 4/2011 | Poletti | |
| 7,946,080 B2 | 5/2011 | Ellerton et al. | |
| 8,035,478 B2 | 10/2011 | Lee | |
| 8,035,479 B2 | 10/2011 | Tran | |
| 8,061,166 B2 | 11/2011 | Tsai | |
| 8,146,392 B2 | 4/2012 | Topfer | |
| 8,151,609 B2 | 4/2012 | Stobbe et al. | |
| 8,161,779 B2 | 4/2012 | Bergmann | |
| 8,161,780 B1 | 4/2012 | Huml | |
| 8,199,011 B2 | 6/2012 | Lu | |
| 8,231,051 B2 | 7/2012 | Popowski | |
| 8,348,308 B2 | 1/2013 | Hagemeyer et al. | |
| 8,353,189 B2 | 1/2013 | Bogdanov et al. | |
| 8,354,914 B2 | 1/2013 | Buckingham et al. | |
| 8,358,197 B2 | 1/2013 | Tran | |
| 8,375,645 B2 | 2/2013 | Iwauchi et al. | |
| 8,381,444 B1 | 2/2013 | McDonald | |
| 8,382,166 B2 | 2/2013 | Hagemeyer et al. | |
| 8,398,126 B2 | 3/2013 | Nakanishi et al. | |
| 8,419,087 B2 | 4/2013 | Shen | |
| 8,448,382 B2 | 5/2013 | Rodgers et al. | |
| 8,482,377 B2 | 7/2013 | Finkenzeller | |
| 8,505,169 B2 | 8/2013 | Wood et al. | |
| 8,517,747 B2 | 8/2013 | Bryla et al. | |
| 8,534,099 B2 | 9/2013 | Wheeler et al. | |
| 8,534,100 B2 | 9/2013 | Tsai | |
| 8,540,288 B2 | 9/2013 | Tsai | |
| 8,550,506 B2 | 10/2013 | Nakanishi et al. | |
| 8,571,471 B2 | 10/2013 | Kuenzi et al. | |
| 8,624,750 B2 * | 1/2014 | Azancot | H01F 38/14 |
| | | | 340/657 |
| 8,628,126 B2 | 1/2014 | Hagemeyer et al. | |
| 8,772,970 B2 | 7/2014 | Lambron | |
| 8,774,714 B2 | 7/2014 | Metivier | |
| 8,839,562 B2 | 9/2014 | Madrid | |
| 8,887,542 B2 | 11/2014 | Bogdanov et al. | |
| 8,899,635 B2 | 12/2014 | Nakanishi et al. | |
| 8,905,443 B2 | 12/2014 | Alber | |
| 8,937,526 B2 | 1/2015 | Chandler, Jr. | |
| 8,973,416 B2 | 3/2015 | Terei et al. | |
| 8,997,535 B2 | 4/2015 | Jeffries | |
| 9,003,841 B2 | 4/2015 | Koh | |
| 9,024,759 B2 | 5/2015 | Uyeda et al. | |
| 9,057,210 B2 | 6/2015 | Dumas et al. | |
| 9,074,391 B2 | 7/2015 | Van Parys | |
| 9,074,392 B2 | 7/2015 | Berger | |
| 9,097,037 B2 | 8/2015 | McKibben et al. | |
| 9,098,953 B2 | 8/2015 | Kincaid et al. | |
| 9,115,518 B2 | 8/2015 | Herglotz et al. | |
| 9,129,457 B2 | 9/2015 | Sumcad et al. | |
| 9,169,666 B2 | 10/2015 | Hodgin | |
| 9,169,668 B2 | 10/2015 | George | |
| 9,212,506 B2 | 12/2015 | Murphy et al. | |
| 9,218,696 B2 | 12/2015 | Dumas et al. | |
| 9,222,286 B2 | 12/2015 | Uyeda | |
| 9,235,942 B2 | 1/2016 | Chen et al. | |
| 9,284,750 B2 | 3/2016 | Maeng et al. | |
| 9,287,705 B2 | 3/2016 | Meyer et al. | |
| 9,290,966 B2 | 3/2016 | Hanchett, Jr. | |
| 9,309,696 B2 | 4/2016 | Friese | |
| 9,316,021 B2 | 4/2016 | Burciaga | |
| 9,317,984 B2 | 4/2016 | Cregg et al. | |
| 9,322,194 B2 | 4/2016 | Cheng et al. | |
| 9,322,195 B2 | 4/2016 | Ainley et al. | |
| 9,322,201 B1 | 4/2016 | Cheng et al. | |
| 9,326,094 B2 | 4/2016 | Johnson et al. | |

(56)             References Cited

U.S. PATENT DOCUMENTS

| 9,328,532 | B2 | 5/2016 | Nguyen et al. |
| 9,334,676 | B2 | 5/2016 | Lambrou et al. |
| 9,336,637 | B2 | 5/2016 | Neil et al. |
| 9,342,936 | B2 | 5/2016 | Scalisi |
| 9,361,741 | B2 | 6/2016 | Robertson et al. |
| 9,376,849 | B2 | 6/2016 | Lim |
| 9,378,596 | B2 | 6/2016 | Shen et al. |
| 9,378,597 | B2 | 6/2016 | Shen et al. |
| 9,378,598 | B2 | 6/2016 | Dumas et al. |
| 9,382,739 | B1 | 7/2016 | Johnson et al. |
| 9,390,572 | B2 | 7/2016 | Almomani |
| 9,396,599 | B1 | 7/2016 | Malhotra |
| 9,406,180 | B2 | 8/2016 | Eberwine et al. |
| 9,406,181 | B2 | 8/2016 | Almomani et al. |
| 9,428,937 | B2 | 8/2016 | Tagtow |
| 9,428,940 | B1 | 8/2016 | Patrick |
| 9,435,142 | B2 | 9/2016 | Carpenter et al. |
| 9,435,143 | B2 | 9/2016 | Shen |
| 9,437,062 | B2 | 9/2016 | Ahearn et al. |
| 9,441,401 | B2 | 9/2016 | Nardelli et al. |
| 9,447,609 | B2 | 9/2016 | Johnson et al. |
| 9,470,017 | B1 | 10/2016 | Cheng et al. |
| 9,470,028 | B2 | 10/2016 | Header |
| 9,472,034 | B2 | 10/2016 | Ahearn et al. |
| 9,487,971 | B2 | 11/2016 | Quach et al. |
| 9,500,007 | B2 | 11/2016 | Lambrou et al. |
| 9,501,880 | B2 | 11/2016 | Handville et al. |
| 9,501,883 | B2 | 11/2016 | Handville et al. |
| 9,502,884 | B2 | 11/2016 | Ghisla et al. |
| 9,506,278 | B2 | 11/2016 | Mattrisch |
| 9,509,163 | B2 | 11/2016 | Corbin et al. |
| 9,512,643 | B1 | 12/2016 | Keefe |
| 9,514,585 | B2 | 12/2016 | Ahearn et al. |
| 9,520,227 | B2 | 12/2016 | Herglotz et al. |
| 9,524,601 | B1 | 12/2016 | Dumas |
| 9,528,294 | B2 | 12/2016 | Johnson et al. |
| 9,528,296 | B1 | 12/2016 | Cheng et al. |
| 9,530,262 | B2 | 12/2016 | Johnson |
| 9,530,264 | B2 | 12/2016 | Caterino et al. |
| 9,534,420 | B1 | 1/2017 | Cheng et al. |
| 9,536,363 | B2 | 1/2017 | Ahearn et al. |
| 9,539,755 | B2 | 1/2017 | Morin et al. |
| 9,540,843 | B2 | 1/2017 | Garrett |
| 9,546,504 | B2 | 1/2017 | Overgaard |
| 9,574,372 | B2 | 2/2017 | Johnson et al. |
| 9,580,931 | B2 | 2/2017 | Myers et al. |
| 9,580,934 | B2 | 2/2017 | Baty et al. |
| 9,593,516 | B2 | 3/2017 | Nakanishi et al. |
| 9,605,461 | B2 | 3/2017 | Zimmer |
| 9,607,459 | B2 | 3/2017 | Chang |
| 9,613,476 | B2 | 4/2017 | Johnson |
| 9,613,478 | B2 | 4/2017 | Dumas et al. |
| 9,617,757 | B2 | 4/2017 | Lowder |
| 9,624,695 | B1 | 4/2017 | Cheng et al. |
| 9,624,701 | B2 | 4/2017 | Taylor et al. |
| 9,626,814 | B2 | 4/2017 | Eyring et al. |
| 9,631,400 | B2 | 4/2017 | Liu et al. |
| 9,631,920 | B2 | 4/2017 | Goldenson |
| 9,637,957 | B2 | 5/2017 | Hagemeyer |
| 9,640,004 | B2 | 5/2017 | Lowder |
| 9,644,398 | B1 | 5/2017 | Cheng et al. |
| 9,644,401 | B2 | 5/2017 | Nguyen et al. |
| 9,652,917 | B2 | 5/2017 | Johnson et al. |
| 9,670,696 | B2 | 6/2017 | Chong |
| 9,673,868 | B2 | 6/2017 | Curtis |
| 9,691,207 | B2 | 6/2017 | Almomani |
| 9,702,168 | B2 | 7/2017 | Jadallah et al. |
| 9,704,316 | B2 | 7/2017 | Kirkjan |
| 9,721,412 | B2 | 8/2017 | Kankkunen et al. |
| 9,725,926 | B2 | 8/2017 | Carpenter et al. |
| 9,758,990 | B2 | 9/2017 | Beck |
| 9,758,997 | B2 | 9/2017 | Hagemeyer et al. |
| 9,787,127 | B2 * | 10/2017 | Shen ...................... E05B 63/16 |
| 9,790,716 | B2 | 10/2017 | Hagemeyer |
| 9,825,443 | B2 | 11/2017 | Shah et al. |
| 9,850,685 | B2 | 12/2017 | Dore Vasudevan et al. |
| 9,871,399 | B2 | 1/2018 | Mittleman et al. |
| 9,876,387 | B2 | 1/2018 | Geiszler |
| 9,940,766 | B2 | 4/2018 | Toivonen et al. |
| 9,988,830 | B2 | 6/2018 | Raz |
| 9,991,936 | B2 | 6/2018 | Toivonen et al. |
| 10,033,972 | B2 | 7/2018 | Almomani et al. |
| 10,049,517 | B2 | 8/2018 | Geiszler |
| 10,062,230 | B2 | 8/2018 | Ahearn et al. |
| 10,077,588 | B1 | 9/2018 | Header |
| 10,078,929 | B1 | 9/2018 | Chen |
| 10,125,519 | B1 | 11/2018 | Gengler et al. |
| 10,132,104 | B2 | 11/2018 | Dore Vasudevan et al. |
| 10,135,288 | B2 | 11/2018 | Geiszler |
| 10,147,254 | B1 | 12/2018 | Shen |
| 10,171,974 | B2 | 1/2019 | Ahearn et al. |
| 10,192,372 | B2 | 1/2019 | Einberg |
| 10,202,785 | B2 | 2/2019 | Overgaard |
| 10,233,672 | B2 | 3/2019 | McKibben et al. |
| 10,240,365 | B2 | 3/2019 | Almomani et al. |
| 10,278,547 | B2 | 5/2019 | Morin |
| 10,347,064 | B2 | 7/2019 | Kim et al. |
| 10,378,238 | B2 | 8/2019 | Beck et al. |
| 10,438,431 | B2 | 10/2019 | Stephens et al. |
| 10,465,422 | B2 | 11/2019 | Ullrich et al. |
| 10,482,697 | B2 | 11/2019 | Kirkjan |
| 10,538,947 | B2 | 1/2020 | Boring |
| 10,876,324 | B2 | 12/2020 | Jaskiewicz et al. |
| 10,982,477 | B2 | 4/2021 | Procton et al. |
| 10,988,965 | B2 | 4/2021 | Procton et al. |
| 11,060,323 | B2 | 7/2021 | Almomani et al. |
| 11,066,862 | B1 | 7/2021 | Rowland |
| 11,373,471 | B2 | 6/2022 | Anderson et al. |
| 11,560,736 | B2 | 1/2023 | Kendall et al. |
| 11,634,944 | B2 | 4/2023 | MacDonald et al. |
| 11,686,126 | B2 | 6/2023 | Simon et al. |
| 11,739,564 | B2 | 8/2023 | Kendall et al. |
| 12,176,722 | B2 * | 12/2024 | Chen ...................... H02J 50/80 |
| 2005/0179267 | A1 | 8/2005 | Cote et al. |
| 2006/0000247 | A1 | 1/2006 | Moon et al. |
| 2006/0112747 | A1 | 6/2006 | Moon et al. |
| 2006/0164206 | A1 | 7/2006 | Buckingham et al. |
| 2006/0267357 | A1 | 11/2006 | Semtilli |
| 2008/0127686 | A1 | 6/2008 | Hwang |
| 2008/0185918 | A1 | 8/2008 | Metz et al. |
| 2008/0211239 | A1 | 9/2008 | Keller |
| 2009/0255303 | A1 | 10/2009 | Stobbe et al. |
| 2009/0308116 | A1 | 12/2009 | Lambrou |
| 2010/0026449 | A1 | 2/2010 | Popowski |
| 2010/0050530 | A1 | 3/2010 | Blasi |
| 2010/0308957 | A1 | 12/2010 | Finkenzeller |
| 2011/0018680 | A1 | 1/2011 | Lai et al. |
| 2011/0056136 | A1 | 3/2011 | Rodgers et al. |
| 2011/0296761 | A1 | 12/2011 | Wood et al. |
| 2012/0021628 | A1 | 1/2012 | Bryla et al. |
| 2012/0108168 | A1 | 5/2012 | Metivier |
| 2012/0242165 | A1 | 9/2012 | Herglotz et al. |
| 2012/0267962 | A1 | 10/2012 | Hanchett, Jr. |
| 2012/0270496 | A1 | 10/2012 | Kuenzi et al. |
| 2012/0280789 | A1 | 11/2012 | Gerhardt et al. |
| 2013/0002397 | A1 | 1/2013 | Chandler, Jr. |
| 2013/0015674 | A1 | 1/2013 | He |
| 2013/0176107 | A1 | 7/2013 | Dumas et al. |
| 2013/0192317 | A1 | 8/2013 | McKibben et al. |
| 2013/0234453 | A1 | 9/2013 | Murphy et al. |
| 2013/0344760 | A1 * | 12/2013 | Snider ...................... E06B 5/16 |
| | | | 442/181 |
| 2014/0001878 | A1 | 1/2014 | Meyer et al. |
| 2014/0002236 | A1 | 1/2014 | Pineau et al. |
| 2014/0020295 | A1 | 1/2014 | Bonahoom et al. |
| 2014/0033773 | A1 | 2/2014 | Myers et al. |
| 2014/0069154 | A1 | 3/2014 | Dolev |
| 2014/0077618 | A1 | 3/2014 | Herglotz et al. |
| 2014/0077929 | A1 | 3/2014 | Dumas et al. |
| 2014/0089097 | A1 | 3/2014 | Byun et al. |
| 2014/0145823 | A1 | 5/2014 | Aase |
| 2014/0165677 | A1 | 6/2014 | Hickman |
| 2014/0197692 | A1 | 7/2014 | Chen et al. |
| 2014/0292481 | A1 | 10/2014 | Dumas et al. |

(56) References Cited

U.S. PATENT DOCUMENTS

| | | |
|---|---|---|
| 2014/0340032 A1 | 11/2014 | Curtis |
| 2014/0340196 A1 | 11/2014 | Myers et al. |
| 2014/0345084 A1 | 11/2014 | Herglotz et al. |
| 2015/0107316 A1 | 4/2015 | Kirkjan |
| 2015/0114055 A1 | 4/2015 | Frolov et al. |
| 2015/0128667 A1 | 5/2015 | Yoon et al. |
| 2015/0130287 A1 | 5/2015 | Steudtner et al. |
| 2015/0176311 A1 | 6/2015 | Picard et al. |
| 2015/0184425 A1 | 7/2015 | Ellis et al. |
| 2015/0252595 A1 | 9/2015 | Hagemeyer et al. |
| 2015/0308155 A1 | 10/2015 | Eller et al. |
| 2015/0315816 A1 | 11/2015 | Gopalakrishnan et al. |
| 2016/0017638 A1 | 1/2016 | Dore Vasudevan et al. |
| 2016/0060902 A1 | 3/2016 | Corbin et al. |
| 2016/0060904 A1 | 3/2016 | Dore Vasudevan et al. |
| 2016/0093130 A1 | 3/2016 | Shen et al. |
| 2016/0108650 A1 | 4/2016 | Hagemeyer et al. |
| 2016/0160530 A1 | 6/2016 | Shen |
| 2016/0163139 A1 | 6/2016 | Kankkunen et al. |
| 2016/0189459 A1 | 6/2016 | Johnson et al. |
| 2016/0194903 A1 | 7/2016 | White |
| 2016/0240023 A1 | 8/2016 | Toivonen et al. |
| 2016/0244994 A1 | 8/2016 | Nguyen et al. |
| 2016/0273243 A1 | 9/2016 | Geringer et al. |
| 2016/0308396 A1 | 10/2016 | Lewis et al. |
| 2016/0312504 A1 | 10/2016 | Marsh |
| 2016/0319569 A1 | 11/2016 | Johnson et al. |
| 2016/0328901 A1 | 11/2016 | Johnson |
| 2016/0350988 A1 | 12/2016 | Malhotra |
| 2016/0350989 A1 | 12/2016 | Chang |
| 2016/0362914 A1 | 12/2016 | Carpenter et al. |
| 2016/0376816 A1 | 12/2016 | Graham |
| 2017/0002586 A1 | 1/2017 | Lee |
| 2017/0018956 A1 | 1/2017 | Geiszler |
| 2017/0030112 A1 | 2/2017 | Kane |
| 2017/0032597 A1 | 2/2017 | Johnson |
| 2017/0032602 A1 | 2/2017 | Cheng et al. |
| 2017/0040827 A1* | 2/2017 | Weber .................... E05B 47/00 |
| 2017/0053468 A1 | 2/2017 | Johnson |
| 2017/0053469 A1 | 2/2017 | Cheng et al. |
| 2017/0058579 A1 | 3/2017 | Wolf et al. |
| 2017/0152681 A1 | 6/2017 | Chiou et al. |
| 2017/0167164 A1 | 6/2017 | Baty et al. |
| 2017/0191287 A1 | 7/2017 | Mittleman et al. |
| 2017/0226784 A1 | 8/2017 | Davis et al. |
| 2017/0259654 A1 | 9/2017 | Mcdonald, II et al. |
| 2017/0264090 A1 | 9/2017 | Shah et al. |
| 2017/0301166 A1 | 10/2017 | Earles et al. |
| 2017/0331320 A1 | 11/2017 | Geiszler |
| 2017/0358952 A1 | 12/2017 | Butler et al. |
| 2017/0373723 A1 | 12/2017 | Toivonen et al. |
| 2018/0005470 A1 | 1/2018 | Stephens et al. |
| 2018/0051478 A1 | 2/2018 | Tagtow et al. |
| 2018/0051480 A1 | 2/2018 | Tagtow et al. |
| 2018/0058105 A1 | 3/2018 | Van Klompenburg |
| 2018/0068508 A1 | 3/2018 | Kirkjan |
| 2018/0073275 A1 | 3/2018 | Ullrich et al. |
| 2018/0114389 A1 | 4/2018 | Geiszler |
| 2018/0155962 A1 | 6/2018 | Mitchell et al. |
| 2018/0187464 A1 | 7/2018 | Moon et al. |
| 2018/0190055 A1 | 7/2018 | Kim et al. |
| 2018/0202194 A1 | 7/2018 | Jaskiewicz et al. |
| 2018/0298642 A1 | 10/2018 | Tagtow et al. |
| 2018/0313115 A1 | 11/2018 | Overgaard |
| 2018/0313116 A1 | 11/2018 | Criddle et al. |
| 2018/0323632 A1* | 11/2018 | Astarabadi .......... E05B 47/0012 |
| 2018/0328075 A1 | 11/2018 | Coster et al. |
| 2018/0340351 A1 | 11/2018 | Harkonen et al. |
| 2018/0355648 A1 | 12/2018 | Procton et al. |
| 2018/0355649 A1 | 12/2018 | Procton et al. |
| 2019/0006875 A1 | 1/2019 | Bien et al. |
| 2019/0024437 A1 | 1/2019 | Tagtow et al. |
| 2019/0040653 A1 | 2/2019 | Baumgarte et al. |
| 2019/0051075 A1 | 2/2019 | Ahearn et al. |
| 2019/0066413 A1 | 2/2019 | McLeod et al. |
| 2019/0066419 A1 | 2/2019 | McLeod et al. |
| 2019/0078361 A1 | 3/2019 | Worden et al. |
| 2019/0119952 A1 | 4/2019 | Jaskiewicz |
| 2019/0280531 A1 | 9/2019 | Ahmed et al. |
| 2019/0360260 A1 | 11/2019 | Hunter |
| 2020/0048933 A1 | 2/2020 | Li et al. |
| 2020/0349786 A1 | 11/2020 | Ho et al. |
| 2021/0025214 A1 | 1/2021 | Dora |
| 2021/0102406 A1 | 4/2021 | Jaskiewicz et al. |
| 2021/0102407 A1 | 4/2021 | Jaskiewicz et al. |
| 2021/0207421 A1 | 7/2021 | Sorice et al. |
| 2022/0255349 A1* | 8/2022 | Poulin .................. H02J 7/0068 |
| 2022/0319264 A1 | 10/2022 | Anderson et al. |

FOREIGN PATENT DOCUMENTS

| | | | | |
|---|---|---|---|---|
| CA | 2833984 A1 | 11/2012 | | |
| CN | 101924398 A | 12/2010 | | |
| CN | 103477010 A | 12/2013 | | |
| CN | 204103574 U | 1/2015 | | |
| CN | 104790834 A | 7/2015 | | |
| CN | 105896708 A | 8/2016 | | |
| CN | 105896739 A | 8/2016 | | |
| CN | 106385112 A | 2/2017 | | |
| CN | 106593124 A | 4/2017 | | |
| CN | 206237206 U | 6/2017 | | |
| CN | 107069986 A | 8/2017 | | |
| CN | 107257155 A | 10/2017 | | |
| CN | 107508352 A | 12/2017 | | |
| CN | 105896708 B | 5/2018 | | |
| CN | 107979148 A | 5/2018 | | |
| CN | 108616169 A | 10/2018 | | |
| CN | 108729758 A | 11/2018 | | |
| CN | 108767941 A | 11/2018 | | |
| CN | 109469412 A | 3/2019 | | |
| CN | 106934881 B | 4/2019 | | |
| CN | 110130737 A | 8/2019 | | |
| CN | 110165758 A | 8/2019 | | |
| CN | 106385112 B | 11/2019 | | |
| DE | 3612761 A1 | 10/1987 | | |
| DE | 10139675 A1 | 2/2003 | | |
| DE | 102007021979 B3 | 8/2008 | | |
| DE | 102008008142 A1 | 8/2009 | | |
| DE | 102008049328 A1 * | 4/2010 | ............... | E06B 7/28 |
| DE | 102010061173 B3 | 1/2012 | | |
| DE | 202012007916 U1 | 10/2012 | | |
| DE | 102013109272 A1 | 3/2015 | | |
| DE | 102009061095 B3 | 2/2016 | | |
| EP | 0330828 B1 | 11/1992 | | |
| EP | 0846823 A1 | 6/1998 | | |
| EP | 0942135 A1 | 9/1999 | | |
| EP | 1182312 A2 | 2/2002 | | |
| EP | 1340871 A2 | 9/2003 | | |
| EP | 1408456 A2 | 4/2004 | | |
| EP | 1464783 A2 | 10/2004 | | |
| EP | 1617020 A2 | 1/2006 | | |
| EP | 2264263 A2 | 12/2010 | | |
| EP | 2441055 A1 | 4/2012 | | |
| EP | 2468989 A2 | 6/2012 | | |
| EP | 2919202 A1 | 9/2015 | | |
| EP | 3059359 A1 | 8/2016 | | |
| EP | 2660785 A3 | 3/2017 | | |
| EP | 3349192 A1 | 7/2018 | | |
| FR | 2677396 B1 | 9/1995 | | |
| FR | 3028547 A1 | 5/2016 | | |
| GB | 452535 A | 8/1936 | | |
| GB | 2323626 A | 9/1998 | | |
| GB | 2358668 A | 8/2001 | | |
| GB | 2400135 A | 10/2004 | | |
| GB | 2483888 A | 3/2012 | | |
| JP | 2003184369 A | 7/2003 | | |
| KR | 20010027072 A | 4/2001 | | |
| KR | 100341117 B1 | 6/2002 | | |
| KR | 200402154 Y1 | 11/2005 | | |
| KR | 20050114754 A | 12/2005 | | |
| KR | 100672847 B1 | 1/2007 | | |
| KR | 101038578 B1 | 6/2011 | | |
| KR | 20110125008 A | 11/2011 | | |
| KR | 101139493 B1 | 5/2012 | | |

(56) References Cited

FOREIGN PATENT DOCUMENTS

| | | | |
|---|---|---|---|
| KR | 20120003725 | U | 5/2012 |
| KR | 200461208 | Y1 | 6/2012 |
| KR | 101511059 | B1 | 4/2015 |
| KR | 101517832 | B1 | 5/2015 |
| KR | 20160018439 | A | 2/2016 |
| KR | 101601153 | B1 | 3/2016 |
| KR | 101610319 | B1 | 4/2016 |
| KR | 101651279 | B1 | 8/2016 |
| KR | 101656046 | B1 | 9/2016 |
| KR | 10-2018-0130212 | A | 12/2018 |
| KR | 20-2019-0001526 | U | 6/2019 |
| WO | 1992104895 | A1 | 9/1992 |
| WO | 0077330 | A1 | 12/2000 |
| WO | 2003095774 | A1 | 11/2003 |
| WO | 2004025057 | A1 | 3/2004 |
| WO | 2005106165 | A2 | 11/2005 |
| WO | 200606834 | A1 | 1/2006 |
| WO | 2007/082959 | A1 | 7/2007 |
| WO | 2007100167 | A1 | 9/2007 |
| WO | 2009115140 | A1 | 9/2009 |
| WO | 2010144449 | A1 | 12/2010 |
| WO | 2011159921 | A1 | 12/2011 |
| WO | 201213589 | A3 | 5/2012 |
| WO | 2014/111502 | A1 | 7/2014 |
| WO | 2014108263 | A1 | 7/2014 |
| WO | 2016/180970 | A1 | 11/2016 |
| WO | 2017006164 | A1 | 1/2017 |
| WO | 2017068518 | A1 | 4/2017 |
| WO | 2018075605 | A1 | 4/2018 |
| WO | 2018/115159 | A1 | 6/2018 |
| WO | 2018/199370 | A1 | 11/2018 |
| WO | 2018204147 | A1 | 11/2018 |
| WO | 2019018901 | A1 | 1/2019 |
| WO | 2019/183340 | A1 | 9/2019 |

OTHER PUBLICATIONS

Machine translation of DE-102008049328-A1 (Year: 2010).*

Kevo Smart Locks, Kwikset, https://www.kwikset.com/kevo, known at least as early as Jan. 20, 2021, 5 pgs.

Unikey Residential Access, Smart Lock Pioneer. http://www.unikey.com/industries/residential/; May 19, 2017. 4 pgs.

Amesbury Hardware Products, Tru-Lock, Multi-Point Swing Door Lock, Amesbury Hardware Products Catalog; Sep. 2011, 12 pgs.

Schlage Sense Smart Deadbolt, http://www.schlage.com/en/home.html,, May 19, 2017, 4 pages.

Lark-Wi Index, Video Smart Lock Smart Keypad Fob App Cloud Solution Product Comparison, http://lark-wi.com/website/Index.html, May 19, 2017, 16 pgs.

Danalock V3—smarten up your home, https://danalock.com/index.html, May 19, 2017, 5 pgs.

August Smart Lock & Smarter Homes Access Products, http://august.com/. May 19, 2017, 3 pgs.

Heid, George, U.S. Appl. No. 29/833,019, filed Mar. 31, 2022.

Canadian Office Action for Canadian Serial No. 3007415, dated Mar. 11, 2019, 4 pgs.

Sierra Pacific Windows, http://www.sierrapacificwindows.com/patio-sliding-doors.cfm, known at least as early as Mar. 4, 2017, 1 pg.

Marvin Windows and Doors, "Built Around You, Remodeling & Replacement Solutions," https://urldefense.proofpoint.com/v2/url?u=http-3A_pdf.archiexpo.com_pdf_-_marvin_remodeling-2Dreplacement-2Dsolutions_9530-2D308205.html, known at least as early as2016, 13 pgs.

Masonite M-PWR Smart Doors, Masonite, https://www.masonite.com/mpwr-smart-doors/, known at least as early as Jun. 20, 2022, 32 pages.

\* cited by examiner

INDUCTION COIL EMBEDDED IN LAMINATE LAYER

CROSS-REFERENCE TO RELATED APPLICATION

This application claims the benefit of, and priority to, U.S. Provisional Patent Application Ser. No. 63/353,972, filed Jun. 21, 2022, the entire contents of which are hereby incorporated herein by reference.

BACKGROUND

1. Technical Field

The present disclosure relates to door panels and frames and, more specifically, to transmitting electrical energy from a door frame to a door panel.

2. Discussion of Related Art

Energy transmission into doors is a challenge due to the motion of the door relative to the frame. For example, pivotally mounted doors may separate from contact with the frame. In addition, the narrow edge of the door provides little space for wires or contacts. Further, the presence of a hinge provides potentially damaging pinch points for wires passing between the frame and the door.

Solutions to transferring electrical energy between the frame to the door panel include placing wires in an articulating arm. Another solution is using a hinge constructed with small holes or openings to permit wires to pass through the hinge. Both of these methods allow electrical energy to be passed between the frame and the door panel continuously whether the door panel is in an open or in a closed position. However, both of these methods can be complicated mechanically and are often visually unpleasing.

SUMMARY

In an embodiment of the present disclosure, a door includes a laminated member, an energy receiver, and an electrical device. The laminated member has a plurality of layers bonded to one another. The energy receiver is configured to inductively receive electrical energy from an energy transmitter. The energy receiver includes a receiver coil which forms a portion of at least one layer of the plurality of layers of the laminated member. The electrical device is disposed substantially or entirely within the door and is electrically coupled to the energy receiver.

In embodiments, the electrical device of the door is a powered lock. The electrical device may be an energy storage unit configured to store electrical energy. The door may include a second electrical device disposed substantially or entirely within the door. The energy storage unit may be electrically coupled to the second electrical device and be configured to provide electrical energy to the second electrical device.

In some embodiments, the laminated member is a stile of the door. The stile may define a lock edge or a hinged edge of the door. The laminated member may be a rail of the door. The rail of the door may define a top edge or a bottom edge of the door. The laminated member may be of unitary construction and may include the receiver coil therewithin.

In certain embodiments, the plurality of layers of the laminated member includes an outermost layer, and innermost layer, and one or more central layers disposed between the outermost layer and the innermost layer. The receiver coil may form a portion of at least one layer of the one or more central layers. Each layer of the one or more central layers has thickness. The thickness of each layer of the one or more central layers may be substantially the same.

In another embodiment of the present disclosure, a door system includes a door frame, an energy transmitter, and a door. The energy transmitter is disposed within the door frame. The door has an exterior surface and an interior surface opposite the exterior surface. The door is pivotally coupled to the door frame such that the door is capable of pivoting between an open position and a closed position. The door includes a laminated member, an energy receiver, and an electrical device. The laminated member has a plurality of layers bonded to one another to form a solid piece of material. The energy receiver is configured to inductively receive electrical energy from the energy transmitter. The energy receiver includes a receiver coil disposed within at least one layer of the plurality of layers of the laminated member. The electrical device is disposed substantially within the door between the exterior surface and the interior surface. The electrical device is electrically coupled to the energy receiver.

In embodiments, the energy receiver is decoupled from the energy transmitter in response to the door pivoting from the closed position. The electrical device may be an energy storage unit configured to store electrical energy transmitted to the energy receiver. The energy storage unit may be a battery. The door system may include a second electrical device. The energy story unit may be electrically coupled to the second electrical device. The energy storage unit may be configured to provide electrical energy to the second electrical device.

In some embodiments, the door frame includes a header, a jamb, and a sill. The energy transmitter may be disposed within the header, the jamb, or the sill such that the energy transmitter is adjacent to the receiver coil when the door is in the closed position.

In another embodiment of the present disclosure, a method of manufacturing a laminated member for a door includes layering a plurality of layers of a material, positioning a receiver coil of an energy receiver within the plurality of layers, and bonding the plurality of layers with one another to form the laminated member. The layers are bonded with one another such that the receiver coil is capable of inductively coupling the energy receiver to an energy transmitter while disposed within the laminated member.

In embodiments, bonding the plurality of layers includes bonding the receiver coil within the plurality of layers such that the laminated member is of unitary construction with the receiver coil disposed there. The method may include electrically coupling the receiver coil to an electrical device of the door.

In particular embodiments, layering the plurality of layers includes disposing the receiver coil between an outermost layer of the plurality of layers and an innermost layer of the plurality of layers such that the receiver coil is entirely disposed within the plurality of layers. Layering the plurality of layers may include disposing the receiver coil closer to the outermost layer than the innermost layer.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
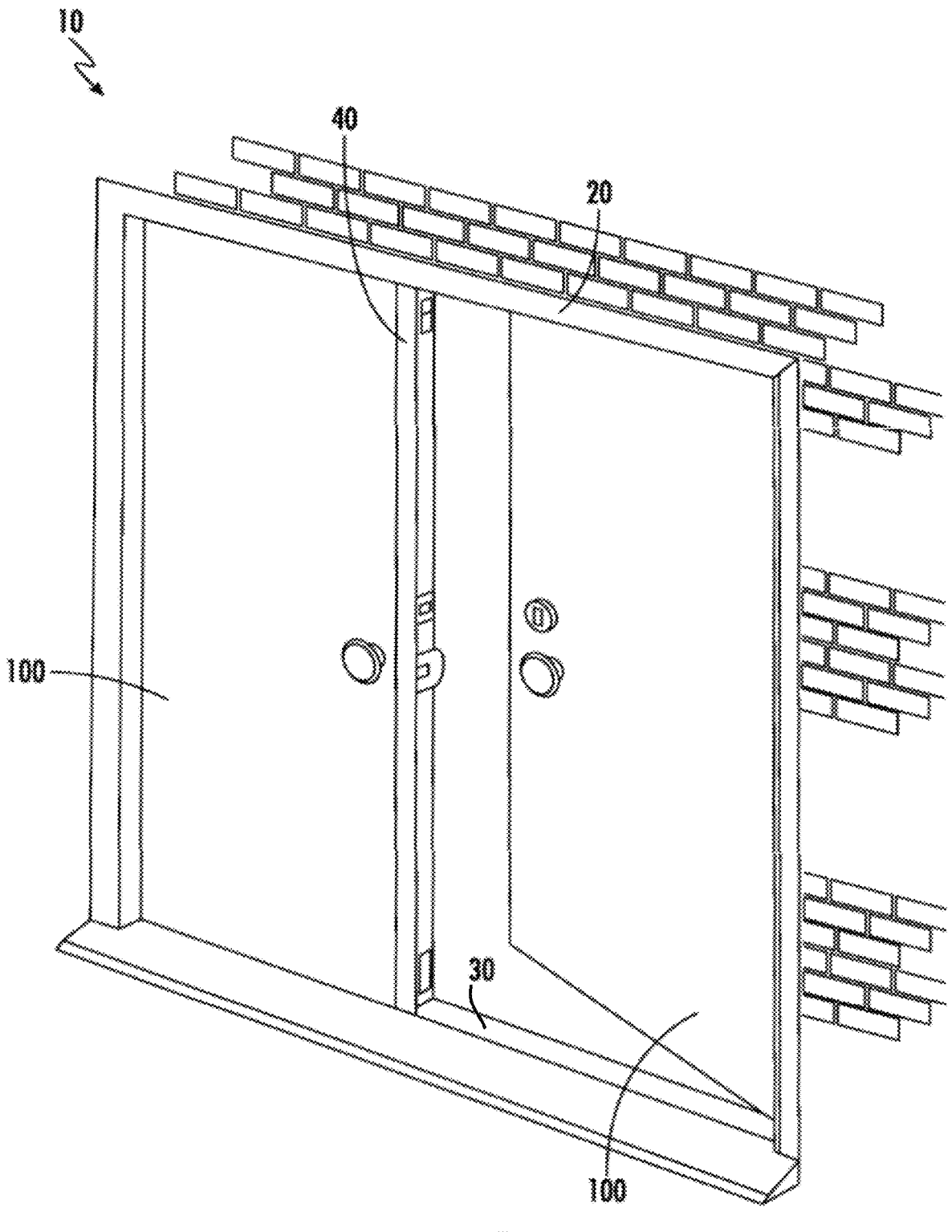
FIG. 1 is a perspective view of an entryway provided in accordance with the present disclosure including a door system having a movable door.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Referring now to FIG. 1, an entryway 10 is provided in accordance with the present disclosure. The entryway 10 includes door system having a door frame 20, a sill 30, an astragal 40, and two doors 100. In some embodiments, an entryway 10 may include a single door 100 such that the entryway 10 does not require an astragal 40. The doors 100 may pivotally couple to the door frame 20 and a pivot between an open position and a closed position.

Figures 5, 6, 7:
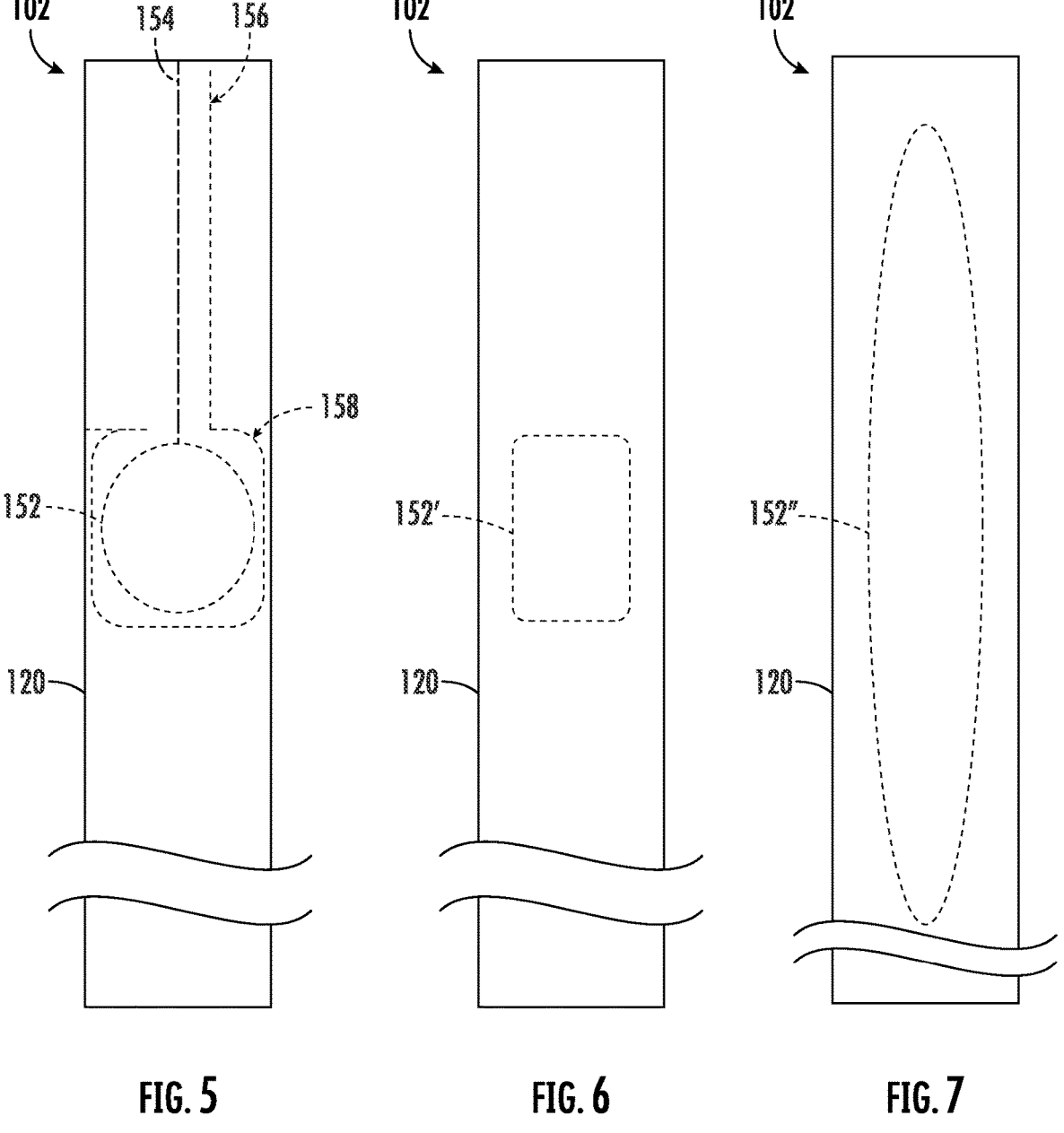
FIG. 5 is a plan view of a laminated member including a receiver coil wound with a circular cross section.
FIG. 6 is a plan view of a laminated member including a receiver coil wound with a rectangular cross section.
FIG. 7 is a plan view of a laminated member including a receiver coil wound with an elliptical cross section.

The door frame 20 includes a power transmitter or energy transmitter 22, as shown in FIG. 5, that provides electrical energy from a power supply or energy supply 24 to the door 100. The energy supply 24 may be an AC or DC energy supply. In some embodiments, the energy supply 24 is hard wired to a power source. In certain embodiments, the energy supply 24 is connected to an electrical outlet or the electrical system of the building, e.g., a standard AC electrical system. In particular embodiments, the energy supply 24 may be a rechargeable battery. The energy transmitter 22 includes a transmission coil 26 that is positioned within the door frame such that the transmission coil 26 is adjacent a respective stile 110 or rail 120 of the door 100 to transfer electrical energy to the door 100. In particular embodiments, the transmission coil 26 may be disposed within the sill 30, the astragal 40, or a mullion 50.

Figure 2:
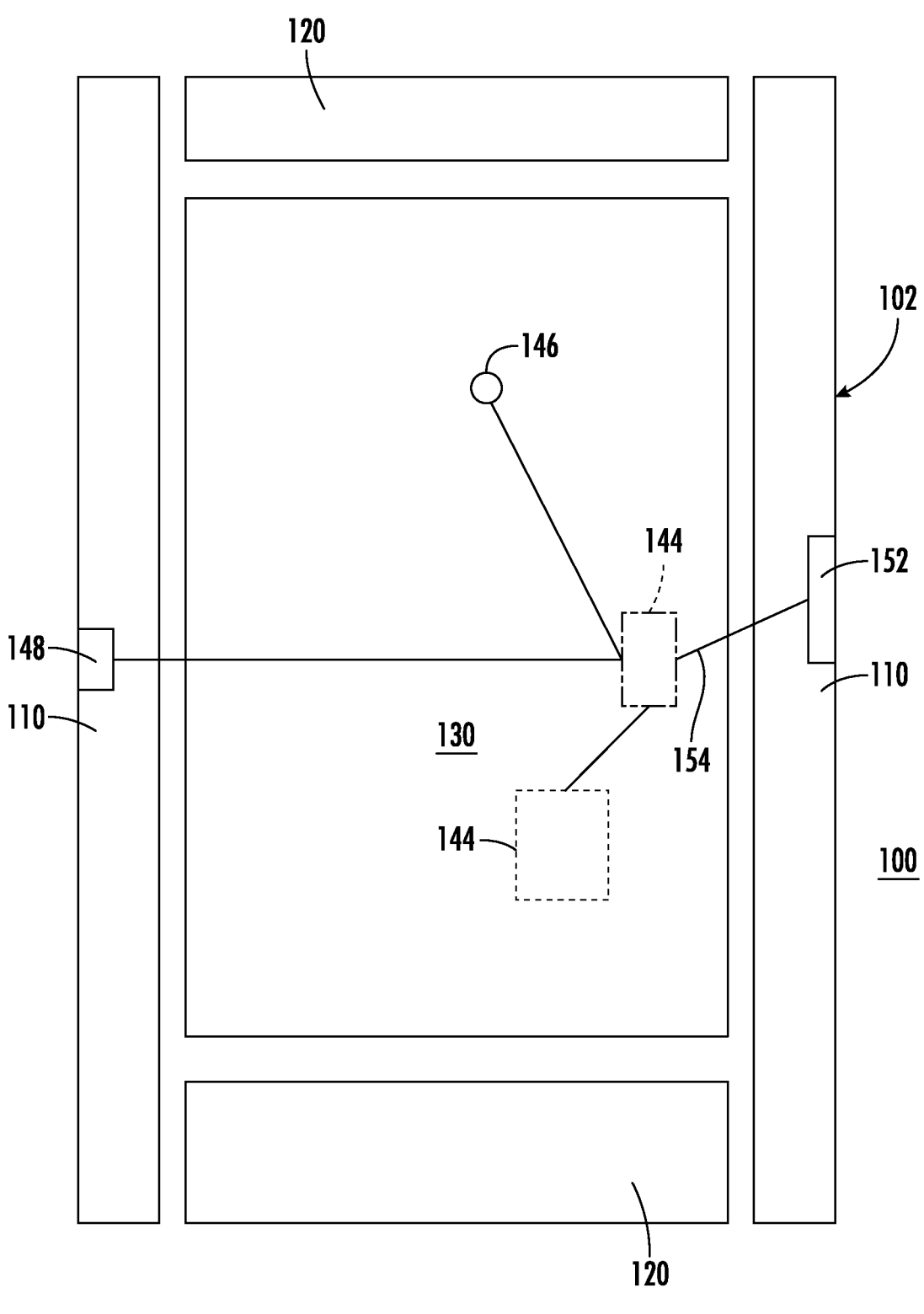
FIG. 2 is a schematic view of components of a door.

With additional reference to FIG. 2, the door 100 includes door stiles 110, door rails 120, and a door panel 130. One of the door stiles 110 forms a lock edge of the door 100 and the other forms the hinged edge of the door 100. One of the door rails 120 forms a top edge of the door 100 and the other forms a bottom edge of the door 100. The rails 120 extend between and connect to each of the stiles 110 to form a perimeter or outer edges of the door 100. The panel 130 may be disposed between the stiles 110 and the rails 120. The panel 130 may be a solid panel or may be formed of a plurality of panels or sections. For example, the panel 130 may define one or more frames that hold panes of glass or other materials such as wood to provide an aesthetically pleasing door.

The door 100 may include one or more powered components or electrical devices that require electrical energy. For example, an electrical device of the door 100 may include a powered lock, a powered deadbolt, a scanner, a camera, sensors, a light, etc. For examples of electrical devices that may be included in a door, reference can be made to U.S. Pat. No. 11,560,736, the entire contents of which are hereby incorporated by reference. For illustrative purposes, the door 100 includes a power storage unit or an energy storage unit 144, a camera 146 and a powered lock 148. The door 100 may be provided without an energy storage unit 144. In some embodiments, the door 100 includes additional electrical devices. Electrical devices may include, but are not limited to, electronic door locks (e.g., push button, biometric reader, RFID reader), intercoms, cameras, sensors (e.g., motion sensors, proximity sensors, contact sensors, pressure sensors), digital displays, and lighting. The electrical devices may be substantially within the door 100 such that only the operative portion of the electrical device extends therefrom. For example, the powered lock 148 may include a main latch which extends from the lock edge of the door 100 to engage the door frame 20 and retain the door 100 in the closed position. As another example, the door 100 may include a camera 146 that is flush with or slightly extends beyond the surface of the panel 130.

The door 100 includes an energy receiver 150 comprising a receiver coil 152. The energy receiver 150 receives energy from the energy transmitter 22 and provides the received energy to the electrical devices within the door 100. The energy receiver 150 may include a rectifier configured to convert AC current to DC or the energy receiver 150 may include an inverter configured to convert DC current to AC current. In certain embodiments, the energy receiver 150 and the energy storage unit 144 may be formed as a single component. The receiver coil 152 can be disposed in one of the stiles 110 or in one of the rails 120. In some embodiments, the door 100 includes multiple receiver coils 152 disposed in one or more of the stiles 110 or the rails 120. In some embodiments, the multiple receiver coils 152 may be disposed within one of the stiles 110 or one of the rails 120, or may be disposed within one of the stiles 110 and one of the rails 120. For example, a first receiver coil 152 may be disposed within one of the rails 120 and a second receiver coil 152 may be disposed within one of the stiles 110. In embodiments containing multiple receiver coils 152, the multiple receiver coils 152 may be disposed within the stiles 110 or rails 120 such that the receiver coils 152 overlap one another.

The energy receiver 150 is in electrical communication with the electrical devices of the door 100. For example, the energy receiver 150 may be hardwired to the energy storage unit 144, the camera 146, or both. The energy storage unit 144 may be a battery or a capacitor that is configured to provide a constant supply of electrical energy to the electrical devices of the door 100.

When the door 100 is in the closed position, the energy receiver 150 may deliver electrical energy to both the energy storage unit 144 and the camera 146. Pivoting the door 100 to the open position may break the inductive coupling between the energy transmitter 22 and the energy receiver 150. The energy storage unit 144 may be configured to automatically supply electrical energy to the other electrical devices of door 100 in response to the energy receiver 150 being decoupled from the energy transmitter 22.

Figures 3, 4:
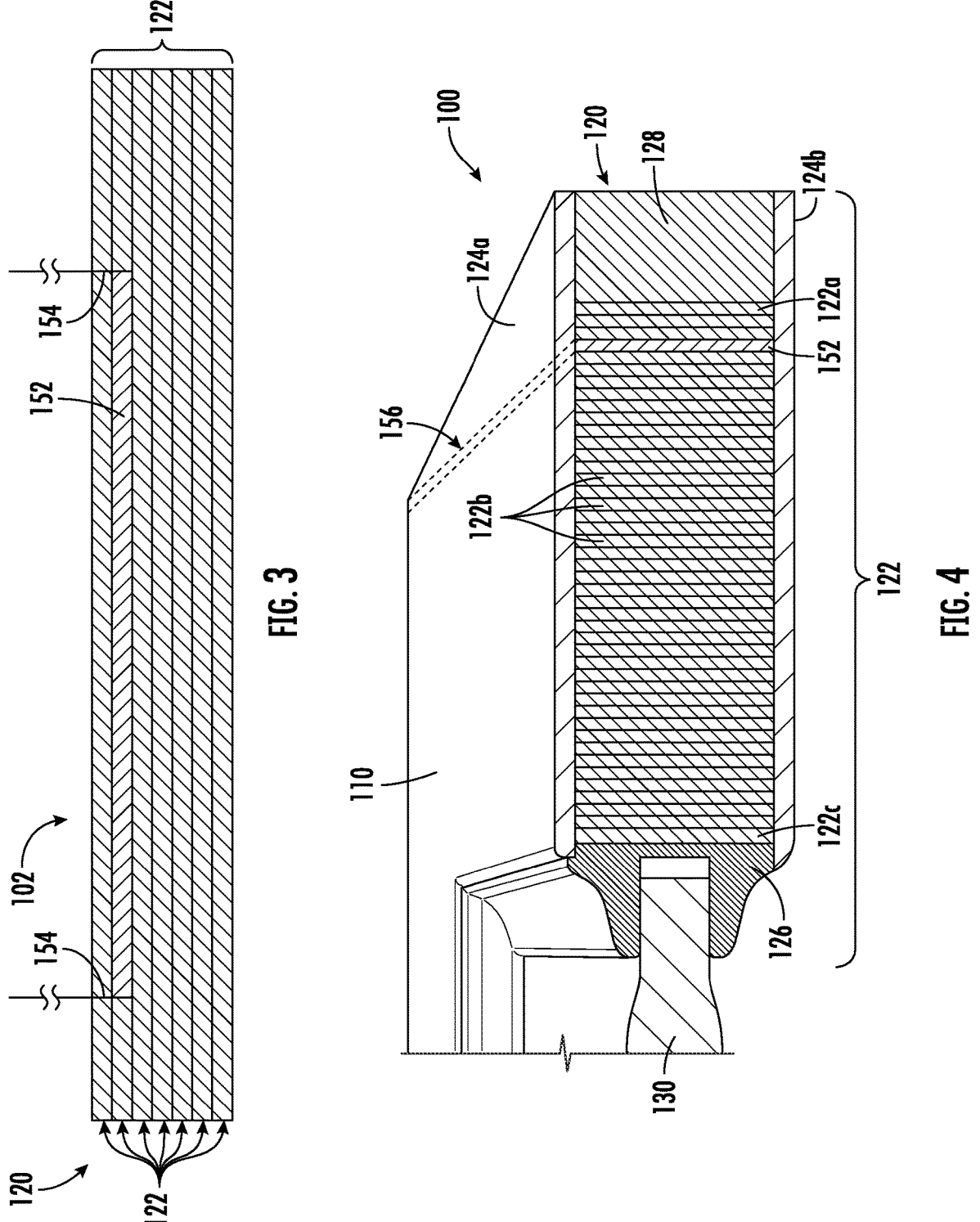
FIG. 3 is a schematic view of a laminated member including a portion of an energy transfer device provided in accordance with the present disclosure.
FIG. 4 is a cross-sectional view of a laminated member including a portion of an energy transfer device provided in accordance with the present disclosure.

With reference to FIGS. 3 and 4, the receiver coil 152 is positioned as a layer in a laminated member 102 forming a door rail 120 in accordance with an embodiment of the present disclosure. While shown in a door rail 120, it is within the scope of this disclosure that the receiver coil 152 is positioned as a layer in a laminated member 102 forming a door stile 110. In embodiments, the stiles 110 and rails 120 of a door 100 may each be formed of a laminated member 102. Where all the stiles 110 and rails 120 are laminated members 102, a receiver coil 152 may be disposed in all of the stiles 110 and rails 120, or may be disposed on one of the stiles 110 or rails 120. In some embodiments, only one of the stiles 110 or rails 120 of the door 100 is formed of a laminated member 102.

The laminated member 102 forming the door rail 120 is formed of a plurality of layers 122 that are bonded together. The door rail 120 may include an outer layer 122a, an inner layer 122c, and central layers 122b therebetween. The outer layer 122a and the inner layer 122c are the exterior most layers of the plurality of layers 122. The laminated member 102 may include a cap 128 that forms a top or bottom of the door 100 and may be configured to receive a sweep of the door 100. The cap 128 may be formed from a decay resistant material, for example a wood composite material. The cap 128 may be bonded to the outer layer 122a during formation of the laminated member 102 or may attached to the outer layer 122a after bonding of the outer layer 122a, the central layers 122b, and inner layer 122c together. In some embodiments, a molding 126 is secured to the inner layer 122c to secure the panel 130 between the stiles 110 and the rails 120. The outer layer 122a, the central layers 122b, and the inner layer 122c may be substantially equal in thickness. In some embodiments, the outer layer 122a or the inner layer 122c may have a thickness greater than or less than the central layers 122b. In certain embodiments, the thickness of the central layers 122b varies. The plurality of layers 122 may be bonded together to form a unitary block and thus a block of solid material. The door rail 120 may include cover layers or veneers 124 to form a front and back surface 124a, 124b of the door rail 120 that is aesthetically pleasing and that hides the plurality of layers 122 therebetween. The veneers 124 may be bonded to the laminated member 102 during or after the formation of the laminated member 102.

As shown in FIGS. 3 and 4, the receiver coil 152 can be disposed within the central layers 122b such that the receiver coil 152 replaces a portion of a single layer of the central layers 122b. In embodiments, the receiver coil 152 may be disposed within the plurality of layers 122 such that the receiver coil 152 is monolithically or unitarily formed with the laminated member 102. In some embodiments, the receiver coil 152 may replace a portion of two layers, three layers, or more than three layers of the central layers 122b. Integrating the receiver coil 152 into the central layers 122b may allow for the receiver coil 152 to be disposed within the door 100 partially or completely hidden within a respective rail 120 or stile 110. The receiver coil 152 can be connected to the energy storage unit 144 or electrical devices of the door 100 by one or more wires 154 that extend from the receiver coil 152. The wires 154 may extend through the plurality of layers 122 or may extend along a joint between the veneers 124 and the plurality of layers 122. In particular embodiments, the plurality of layers 122 may define a passage 156 through which the wires 154 may extend (FIG. 5). The passage 156 may be formed during formation of the laminated member 102 or may be formed after formation of the laminated member 102, for example by cutting, drilling, or milling the passage 156 through the plurality of layers 122. The veneers 124 may cover the passage 156. In some embodiments, the plurality of layers 122 may define a cavity 158 to receive the receiver coil 152 therein. The cavity 158 defined during formation of the laminated member 102 or may be defined after formation of the laminated member 102, for example by cutting or milling the cavity 158 through the plurality of layers 122 during a shaping process.

With additional reference to FIGS. 5-7, the rail 120 has a length and the receiver coil 152 has a diameter. The receiver coil 152 may replace all of or a majority of a layer of the plurality of layers 122. In some embodiments, the receiver coil 152 may be wound to have a circular cross section (FIG. 5). In particular embodiments, the receiver coil 152' may be wound to have a square or rectangular cross section (FIG. 6). The receiver coil 152' wound to have a square or rectangular cross section may have a radius at the corners of the cross section. In certain embodiments, the receiver coil 152" may be wound as an ellipse (FIG. 7) and have a major axis substantially equal in length to the length of the rail 120 such that the receiver coil 152 forms the majority of a layer of the plurality of layers 122 and a minor axis within the width or thickness of the rail 120.

The receiver coil 152 may be disposed within any of the central layers 122b. For example, the receiver coil 152 may be disposed with in the center of the rail 120 such that it is equidistant from the outer layer 122a and the inner layer 122c. In embodiments, the receiver coil 152 may be disposed within the central layers 122b closer to either the outer layer 122a or the inner layer 122c, as shown in FIG. 4. In certain embodiments, the receiver coil 152 may be disposed within the central layers 122b immediately adjacent the outer layer 122a or the inner layer 122c. In embodiments, the receiver coil 152 may be disposed within the outer layer 122a or the inner layer 122c with the cap 128 or the molding 126 bonded or attached to the outer layer 122a or the inner layer 122c, respectively. In some embodiments, the receiver coil 152 may be positioned within the central layers 122b a distance from the outer layer 122a such that the receiver coil 152 is a predetermined distance from the edge of the door 100 formed by the stile 110 or the rail 120. The position of the receiver coil 152 within the laminated member 102 and its distance from the edge of the door 100 may be determined based partially on the material or materials of the laminated member 102 and the door frame 20.

In particular embodiments, the receiver coil 152 and the transmission coil 26 are disposed within the rail 120 and the door frame 20, respectively, such that the receiver coil 152 and the transmission coil 26 are positioned a predetermined distance from one another. For example, the receiver coil 152 may be disposed within a rail 120 forming the top edge of the door 100 such that the receiver coil 152 is positioned a known distance from the transmission coil 26 disposed within the door frame 20 when the door 100 is in the closed position. The distance between the receiver coil 152 and the transmission coil 26 may be a discrete distance, e.g., 10 centimeters, within a range of distances, e.g., between 5 centimeters and 20 centimeters. The position of the receiver coil 152 and the transmission coil 26 relative to one another may be determined by a ratio of the distance between the receiver coil 152 and the transmission coil 26 and the diameters of the receiver coil 152 and the transmission coil 26. In embodiments, the receiver coil 152 and the transmission coil 26 may be positioned relative to one another such that ratio of the distance between the coils and the diameter of the coils is equal to 1. For example, the receiver coil 152 and the transmission coil 26 may each have a diameter of 10 centimeters and be positioned within the rail 120 and the door frame 20, respectively, such that the coils are 10 centimeters from each other. In certain embodiments, the distance between the receiver coil 152 and the transmission coil 26 may be determined by a material of the door frame 20 or a material of one or more layers of the laminated member 102. The distance between the receiver coil 152 and the transmission coil 26 may be determined to optimize energy transfer between the transmission coil 26 and the receiver coil 152.

As detailed above, the receiver coil 152 is disposed within a rail 120 or a stile 110 of the door 100. It is within the scope of this disclosure that the transmission coil 26 may also be disposed within a laminate member forming a portion of the door frame 20, e.g., a vertical or horizontal member of the door frame 20, such that the transmission coil 26 is hidden within the door frame 20.

Figure 8:
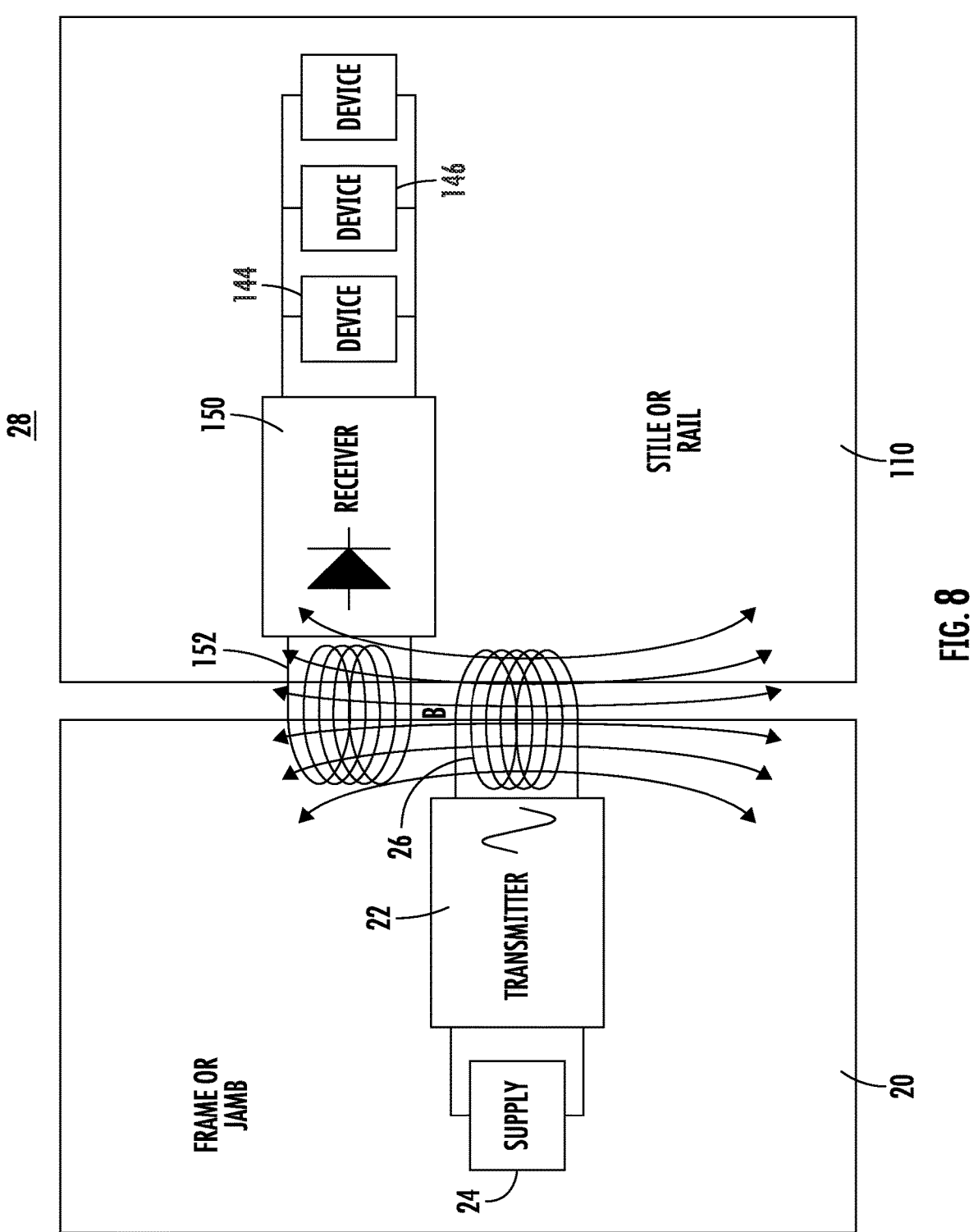
FIG. 8 is a schematic view of an energy transfer device.

Referring to further to FIG. 8, a schematic of an example energy transfer unit 28 is provided in accordance with the present disclosure. The energy transfer unit 28 includes the energy supply 24 and the transmission coil 26 disposed in the door frame 20. In addition, the energy transfer unit 28 includes the receiver coil 152 and the energy storage unit 144 or electrical device within the door 100. The transmission coil 26 and the receiver coil 152 are positioned such that electrical energy can be inductively transferred between the door frame 20 and the rail 120 when the door 100 is in a closed or semi-closed position thereof. In certain embodiments, energy transfer unit 28 may transfer energy between the door frame 20 and the stile 110 when the door 100 is in an open position.

The receiver coil 152 is configured to inductively couple the energy receiver 150 to the energy transmitter 22 such that electrical energy is transmitted from the transmission coil 26 to the energy receiver 150 when the door 100 is in the closed position. In embodiments, the energy transmitter 22 may be configured to cease energy transmission in response to the door 100 moving from the closed position. In some embodiments, the energy storage unit 144 delivers electrical energy to the electrical devices with door 100 in an open position.

In addition to electrical energy, the energy transfer unit 28 may be configured to transfer signals between the door frame 20 and the door 100. The transfer of signals may be unidirectional or bidirectional. Signals to be transferred may include without limitation to power levels, WIFI transponders or receivers, Bluetooth °, Zigbee, video, audio, status, alerts, alarms, mobile telecommunications (3G, 4G, 5G), etc.

The energy transfer unit 28 may be configured to send and receive signals in a spectrum of frequencies. The signals between the door frame 20 and the door 100 may use the energy transfer between the door frame 20 and the door 100 as a carrier signal to allow the transmission of the signals between the door frame 20 and the door 100. In some embodiments, the signals from the door frame 20 to the door 100 may be at a first frequency and the signals from the door 100 to the door frame 20 may be on a second frequency different from the first frequency. This multiplexing, combining and separating of the signals, may occur in the energy transmitter 22 and/or the energy receiver 150.

Figure 9:
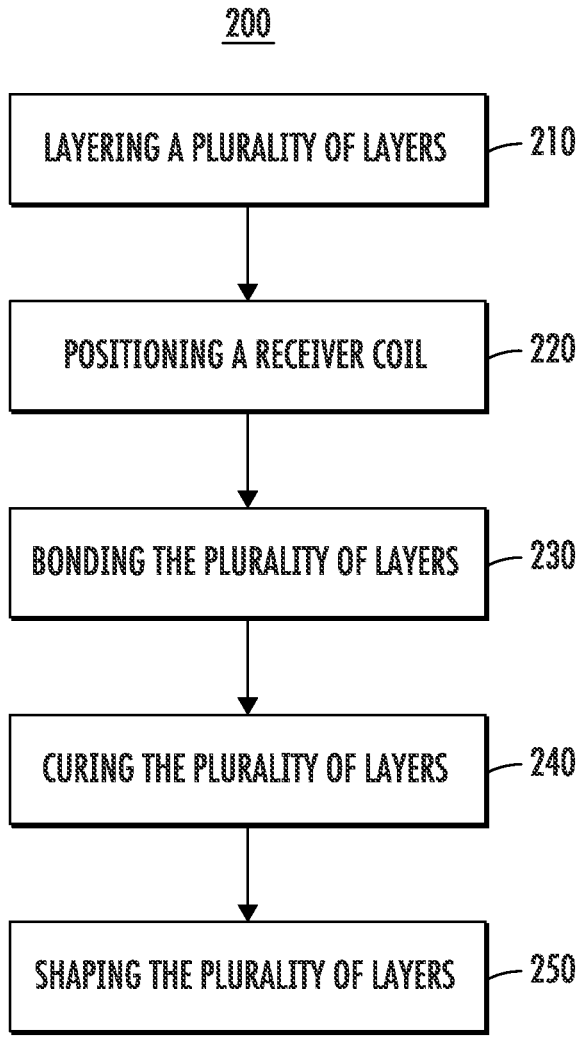
FIG. 9 is a flowchart illustrating a method of manufacturing a laminated member in accordance with the present disclosure.

Referring to FIG. 9, a method 200 of forming a laminated member is provided in accordance with embodiments of the present disclosure with reference to the laminated member 102 of FIGS. 2-8. The laminated member 102 is formed by layering a plurality of layers 122 together (Step 210). Layering the plurality of layers 122 includes applying an adhesive to a first layer of the plurality of layers 122 prior to layering the first layer with a second layer of the plurality of layers 122. Layering may be repeated until the laminated member 102 is formed, e.g., applying adhesive to the second layer and bonding a third layer to the second layer and so on until a desired thickness is achieved. Layering may include cutting the individual layers to a desired length prior to layering with one another. For example, strips of wood having a width of 1-inch, a length of 3-feet, and a thickness of ⅛-inch, each strip forming a layer of the plurality of layers 122 may be layered with each other to achieve the desired thickness of the laminated member 102. The desired thickness may be in a range of 1 inch to 5 inches. In some embodiments, the desired thickness may be less than 1 inch or greater than 5 inches. In embodiments, each layer of the plurality of layers 122 may be formed from a single piece of material or may be formed from several pieces of material. In particular embodiments, layering may include layering a plurality of layers 122 having a length greater than desired and then cutting the laminated member 102 to a desired length of the plurality of layers 122.

During layering, the receiver coil 152 is positioned within the plurality of layers 122 (Step 220). The receiver coil 152 may form a portion of at least one layer of the plurality of layers 122. The receiver coil 152 may be positioned within a layer, or layers, of the plurality of layers 122 at a predetermined layer, or layers, of the plurality of layers 122 once reached by layering. In some embodiments, the receiver coil 152 may form an entire layer of the plurality of layers 122. Adhesive may be applied directly the receiver coil 152 to adhere the receiver coil 152 to the laminated member 102 or may entirely envelop the receiver coil 152. In embodiments, a single layer of the plurality of layers 122 may define the cavity 158 to receive the receiver coil 152. In certain embodiments, multiple layers, e.g., two layers or more, of the plurality of layers 122 may define the cavity 158 and/or the passage 156 to receive the receiver coil 152 and the wires 154, respectively. The layer, or layers, defining the cavity 158 in which the receiver coil 152 is disposed may enclose the receiver coil 152 such that adhesive is prevented from reaching the receiver coil 152.

With the receiver coil 152 positioned within the plurality of layers 122, the plurality of layers 122 are bonded together with the receiver coil 152 positioned within the plurality of layers 122 (Step 230). Bonding the plurality of layer 122 sets the plurality of layers 122 relative to each other such that the plurality of layers 122 resist separation. Bonding may include pressing the laminated member 102, e.g., with a hydraulic press. In certain embodiments, bonding may include subjecting the laminated member 102 to a vacuum to remove air bubbles within the adhesive and/or to increase the penetration depth of the adhesive into the laminated member 102. Subjecting the laminated member 102 to a vacuum during bonding may cause the adhesive to penetrate into the material of the plurality of layers 122. For example, where the plurality of layers 122 are made from a porous material, e.g., wood, subjecting the laminated member 102 to a vacuum may cause adhesive to fill the pores. In particular embodiments, each layer the plurality of layers 122 may be bonded to one another concurrently. For example, each layer of the plurality of layers 122 may be layered with one another within a mold or chamber, and adhesive may be poured or flowed around the plurality of layers 122 to simultaneously bond the plurality of layers 122 to one another.

The method 200 may include curing the adhesive of the laminated member 102 (Step 240). With the laminated member 102 formed, the adhesive of the laminated member 102 may be cured. In embodiments, curing includes allowing the bonded layers 122 of the laminated member 102 to cure for a predetermined amount of time. The predetermined amount of time may be in a range of a few minutes to several days. The duration of curing may be determined by atmospheric conditions such as temperature, pressure, or humidity. In some embodiments, curing includes heating the laminated member 102. The temperature to cure may determine the determine the predetermined amount of time. In certain embodiments, curing includes exposing the laminated member 102 to ultra-violate light (UV). In particular embodiments, the laminated member 102 may be submerged, sprayed, or otherwise exposed to a chemical curing solution.

The method 200 may include shaping the laminated member 102 (Step 250). Shaping the laminated member 102 may include cutting or milling the passage 156 within the plurality of layers 122. In embodiments, shaping may include cutting or sanding of the laminated member 102 to achieve a desired size, shape, or profile.

Although the method steps are described in a specific order, it should be understood that other steps may be performed in between described steps, described steps may be adjusted so that they occur at slightly different times, or the described steps may occur in any order unless otherwise specified.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A door comprising:
a laminated member of a rail or stile having a plurality of layers bonded to one another;
an energy receiver configured to inductively receive electrical energy from an energy transmitter disposed in a door frame, the energy receiver comprising a receiver coil forming a portion of at least one layer of the plurality of layers of the laminated member;
the receiver coil partially or completely hidden within the laminated member of the rail or stile; and
an electrical device disposed substantially or entirely within the door and electrically coupled to the energy receiver, wherein the receiver coil comprises a single layer element disposed between two adjacent layers of the plurality of layers of the laminated member.

2. The door according to claim 1, wherein the electrical device is a powered lock.

3. The door according to claim 1, wherein the electrical device is an energy storage unit configured to store electrical energy.

4. The door according to claim 3, further comprising a second electrical device disposed substantially or entirely within the door, the energy storage unit electrically coupled to the second electrical device and configured to provide electrical energy to the second electrical device.

5. The door according to claim 1, wherein the laminated member is a stile of the door, the stile defining a lock edge or a hinged edge of the door.

6. The door according to claim 1, wherein the laminated member is a rail of the door, the rail defining a top edge or a bottom edge of the door.

7. The door according to claim 1, wherein the laminated member is of unitary construction and includes the receiver coil therewithin.

8. The door according to claim 1, wherein the plurality of layers comprise an outermost layer, an innermost layer, and one or more central layers disposed between the outermost layer and the innermost layer, the receiver coil forming a portion of at least one layer of the one or more central layers.

9. The door according to claim 8, wherein each layer of the one or more central layers has a thickness, the thickness of each layer of the one or more central layers being substantially the same.

10. A door system comprising: a door frame;
an energy transmitter disposed within the door frame; and
a door having an exterior surface and an interior surface opposite the exterior surface, the door pivotally coupled to the door frame such that the door is capable of pivoting between an open position and a closed position, the door comprising:
a laminated member having a plurality of layers bonded to one another to form a solid piece of material;
an energy receiver configured to inductively receive electrical energy from the energy transmitter, the energy receiver comprising a receiver coil disposed within the plurality of layers of the laminated member such that the receiver coil is partially or completely hidden within a rail or stile; and
an electrical device disposed substantially within the door, between the exterior surface and the interior surface, the electrical device electrically coupled to the energy receiver, wherein the receiver coil comprises a single layer element disposed between two adjacent layers of the plurality of layers of the laminated member.

11. The door system according to claim 10, wherein the energy receiver is decoupled from the energy transmitter in response to the door pivoting from the closed position.

12. The door system according to claim 10, wherein the electrical device is an energy storage unit configured to store electrical energy transmitted to the energy receiver.

13. The door system according to claim 12, wherein the energy storage unit is a battery.

14. The door system according to claim 12, further comprising a second electrical device, the energy storage unit electrically coupled to the second electrical device, the energy storage unit configured to provide electrical energy to the second electrical device.

15. The door system according to claim 10, wherein the door frame comprises a header, a jamb, and a sill, the energy transmitter disposed within the header, the jamb, or the sill such that the energy transmitter is adjacent to the receiver coil when the door in the closed position.

16. A method of manufacturing the laminated member for the door as recited in claim 1, the method comprising:
layering the plurality of layers of a material;
    positioning the receiver coil of the energy receiver within the portion of the at least one layer of the plurality of layers; and
    bonding the plurality of layers with one another to form the laminated member such that the receiver coil is capable of inductively coupling the energy receiver to the energy transmitter while disposed within the laminated member.

17. The method according to claim 16, wherein bonding the plurality of layers bonds the receiver coil within the plurality of layers such that the laminated member is of unitary construction with the receiver coil disposed therein.

18. The method according to claim 16, further comprising electrically coupling the receiver coil to the electrical device of the door.

19. The method according to claim 16, wherein layering the plurality of layers includes disposing the receiver coil between an outermost layer of the plurality of layers and an innermost layer of the plurality of layers such that the receiver coil is entirely disposed within the plurality of layers.

20. The method according to claim 19, wherein layering the plurality of layers includes disposing the receiver coil closer to the outermost layer than the innermost layer.

21. The door of claim 1, wherein the receiver coil forms a portion of a single layer of the plurality of layers.

22. The door of claim 8, wherein the receiver coil is monolithically or unitarily formed with the laminated member.

23. The door of claim 1, wherein the laminated member is formed by bonding the plurality of layers together with the receiver coil positioned therein during formation of the laminated member.

24. The door of claim 1, wherein the plurality of layers are bonded together with adhesive such that the receiver coil is enclosed by the bonded laminate layers forming a unitary laminated structure.

25. The door of claim 8, wherein the receiver coil is formed within at least one central layer that is closer to the outermost layer or closer to the innermost layer of the laminated member.

* * * * *